G. W. BROWN.

Seed-Planter.

No. 6,385. Reissued April 20, 1875.

Witnesses:

A. McCallum

J. Knight

Inventor:

Geo. W. Brown,

By W. B. Richards,

Atty.

THE GRAPHIC CO. PHOTO-LITH. 39 & 41 PARK PLACE, N.Y.

UNITED STATES PATENT OFFICE.

GEORGE W. BROWN, OF GALESBURG, ILLINOIS.

IMPROVEMENT IN SEED-PLANTERS.

Specification forming part of Letters Patent No. 46,615, dated February 28, 1865; reissue No. 6,385, dated April 20, 1875; application filed January 6, 1875.

DIVISION B.

*To all whom it may concern:*

Be it known that I, GEORGE W. BROWN, of Galesburg, county of Knox and State of Illinois, have invented certain Improvements in Seed-Planters; and I do hereby declare that the following is a full, clear, and exact description of the construction and operation of the same, reference being had to the annexed drawings, making part of this specification, and to the letters and figures of reference marked thereon.

Figure 1:
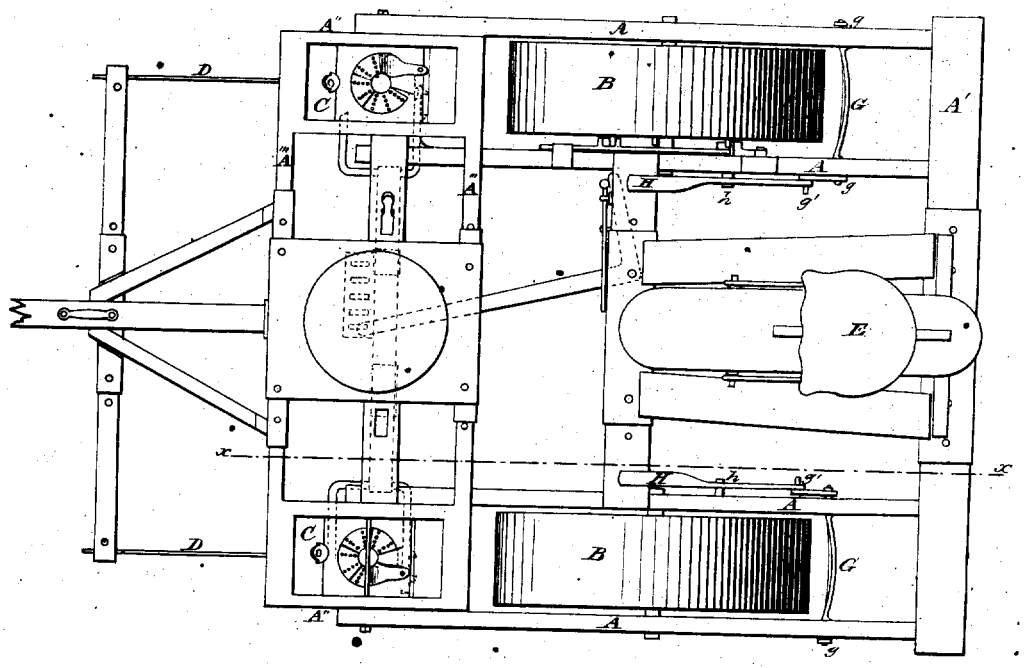
Figure 2:
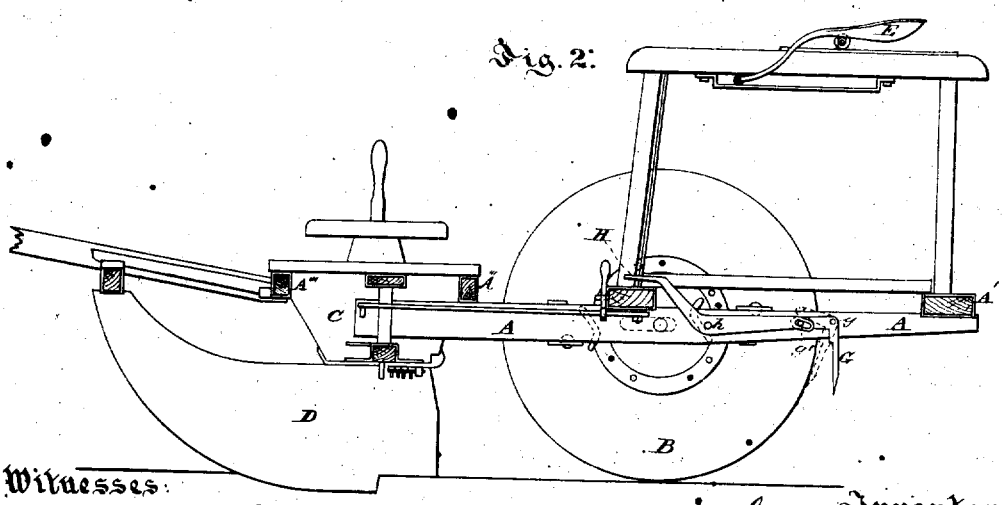

Figure 1 is a top plan view of a machine embodying my invention, and Fig. 2 is a vertical sectional view of Fig. 1 on the line *x x*.

This invention relates to improvements in corn-planting machines of that class in which drums or wheels follow the seeding devices for supporting the main parts of the framework, and for covering more effectually the seed in the ground; and the invention consists in so combining scrapers with the wheels that they may be readily and easily applied, and released to and from the peripheries of the wheels at the will of the operator, all as hereinafter fully described.

To enable others skilled in the art to make and use my invention, I will proceed to describe the same with reference to the accompanying drawing, in which—

Letters A represent the two side frame-pieces of the main frame, supported on wheels B B and connected by transverse bars A′. A″ A″ represent the side frame-pieces of the forward frame, connected by transverse bars A‴, and carrying the seed-hoppers C C, and runners D D, and seed-dropping devices of any ordinary kind. E is the driver's seat mounted on elevated ways F. The forward frame is hinged to the rear frame, and the wheels B follow immediately after the runners D, in the same manner as all ordinary corn-planters. G G are the scraper-blades, one to each wheel B. Each scraper G is pivoted to the side frame-piece, at *g*, so that it may turn freely on said pivot, and is so constructed that its own gravity will swing it away from the wheel B to its normal position. H H are foot-levers hung on fulcrums *h h* to the frame-pieces A, their forward ends formed into pedals, and their rear ends slotted for the reception of a stud, *g′*, projecting from the end of the scraper G. While free to move the scraper G, will each, by its own gravity, swing slightly away from the wheel, as shown by the full lines at Fig. 2.

It will be seen that the driver, by placing his feet upon the pedals H, may press thereon and apply the scrapers to the peripheries of the wheels, as shown by dotted lines at Fig. 2, and he may either apply them separately and independently or together, as desired.

The levers H may be dispensed with, if desired by extending the handles of the scrapers backward instead of forward, in which case the foot or other force may be applied directly thereto, in the obvious manner.

If preferred, the two scrapers may also be connected, so that their movements will be simultaneous.

The advantages of this arrangement are obvious. The constant friction arising from continued contact of the scrapers with the wheels is dispensed with, and the driver may temporarily apply the scrapers as they are occasionally required, and in some kinds of soil much oftener than in others.

What I claim as new, and desire to secure by Letters Patent, is—

In combination with a seed-planting machine carried on wheels, scraper G G″, arranged to be independently or simultaneously forced against the supporting-wheels by the driver's feet and released, substantially as and for the purpose specified.

GEORGE W. BROWN.

Witnesses:

M. D. HEBBERD,

J. J. TUNNICLIFF.